(12) United States Patent
Saito et al.

(10) Patent No.: US 10,569,648 B2
(45) Date of Patent: Feb. 25, 2020

(54) ACCELERATOR DEVICE AND DIE DEVICE FOR ACCELERATOR DEVICE

(71) Applicant: DENSO CORPORATION, Kariya, Aichi-pref. (JP)

(72) Inventors: Takehiro Saito, Kariya (JP); Quoc khanh Vu, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 15/528,865

(22) PCT Filed: Dec. 21, 2015

(86) PCT No.: PCT/JP2015/006334
§ 371 (c)(1),
(2) Date: May 23, 2017

(87) PCT Pub. No.: WO2016/110911
PCT Pub. Date: Jul. 14, 2016

(65) Prior Publication Data
US 2017/0313188 A1    Nov. 2, 2017

(30) Foreign Application Priority Data
Jan. 6, 2015    (JP) .................. 2015-000817

(51) Int. Cl.
*B60K 26/02*    (2006.01)
*G05G 1/44*    (2008.04)
(Continued)

(52) U.S. Cl.
CPC .............. *B60K 26/02* (2013.01); *F02D 11/02* (2013.01); *G05G 1/44* (2013.01); *G05G 5/04* (2013.01);
(Continued)

(58) Field of Classification Search
CPC .... B60K 2026/026; B60K 26/02; G05G 5/04; G05G 5/05; G05G 1/44; F02D 11/02
See application file for complete search history.

(56) References Cited

U.S. PATENT DOCUMENTS 6,666,106 B1    12/2003    Hueges et al.
9,599,035 B2 *    3/2017    Saito ................. F02D 11/106
(Continued)

FOREIGN PATENT DOCUMENTS

JP    3-2826    1/1991
JP    2003-111241    4/2003
(Continued)

OTHER PUBLICATIONS

Definition of Unintended by Merriam-Webster, May 16, 2019 (Year: 2019).*

(Continued)

*Primary Examiner* — Vinh Luong
(74) *Attorney, Agent, or Firm* — Nixon & Vanderhye P.C.

(57) ABSTRACT

An accelerator device includes: a support portion that is installable to a vehicle body; a shaft that is rotatably supported by the support portion; an operable portion that is rotatable integrally with the shaft and is depressible by a driver; an installation blocking portion that is formed in the support portion; and a full opening stopper that limits rotation of the operable portion in an accelerator opening direction when the full opening stopper contacts the operable portion. The installation blocking portion includes a space that opens toward the operable portion. A rib is formed in the space and joins between a top side inner wall and a bottom side inner wall of the space.

5 Claims, 12 Drawing Sheets

(51) Int. Cl.
*F02D 11/02* (2006.01)
*G05G 5/04* (2006.01)
*G05G 5/05* (2006.01)

(52) U.S. Cl.
CPC .......... *G05G 5/05* (2013.01); *B60K 2026/026* (2013.01); *G05G 2505/00* (2013.01)

(56) References Cited

U.S. PATENT DOCUMENTS

| | | | | |
|---|---|---|---|---|
| 2008/0276749 | A1* | 11/2008 | Stewart | G05G 1/38 74/512 |
| 2009/0173587 | A1* | 7/2009 | Campbell | B60K 26/021 188/268 |
| 2010/0077886 | A1* | 4/2010 | Seiltz | G05G 1/38 74/513 |
| 2011/0100153 | A1* | 5/2011 | Kaijala | G05G 1/38 74/512 |
| 2013/0087009 | A1* | 4/2013 | Stewart | B60K 26/021 74/560 |
| 2014/0000408 | A1* | 1/2014 | Saito | G05G 1/44 74/513 |
| 2014/0298949 | A1* | 10/2014 | Brown | G05G 1/40 74/513 |
| 2015/0128755 | A1* | 5/2015 | Kaijala | G05G 25/04 74/514 |
| 2015/0176505 | A1* | 6/2015 | Viet | G05G 5/05 74/514 |
| 2018/0257311 | A1* | 9/2018 | Watanabe | B60K 26/02 |
| 2019/0050018 | A1* | 2/2019 | Henrikson | G05G 1/38 |

FOREIGN PATENT DOCUMENTS

| | | |
|---|---|---|
| JP | 2009-132226 | 6/2009 |
| JP | 2012082725 A * | 4/2012 |
| JP | 2013-10488 A * | 1/2013 |
| JP | 2014-24387 | 2/2014 |
| JP | 2014-141188 | 8/2014 |

OTHER PUBLICATIONS

EPO Machine Translation of JP2009132226 A, Uenoyama et al., Jun. 18, 2009. (Year: 2009).*
EPO Machine Translation of JP2014141188 A, Watanabe et al., Aug. 7, 2014. (Year: 2014).*
EPO Machine Translation of JP2003111241 A, Tanaka et al., Apr. 11, 2003 (Year: 2003).*
English abstract of JP 2012082725 A, Hario et al., Apr. 26, 2012. (Year: 2012).*
Visual agnosia—Wikipedia, Aug. 5, 2019 (Year: 2019).*
Define visually recognizable—Google Search, Aug. 5, 2019 (Year: 2019).*
International Search Report of PCT/JP2015/006334, dated Mar. 29, 2016, 4 pages.
Written Opinion of the ISA for PCT/JP2015/006334, dated Mar. 29, 2016, 4 pages.

* cited by examiner

ACCELERATOR DEVICE AND DIE DEVICE FOR ACCELERATOR DEVICE

The present application is the U.S. national phase of International Application No. PCT/JP2015/006334 filed Dec. 21, 2015, which designated the U.S. and claims priority to Japanese Patent Application No. 2015-000817 filed on Jan. 6, 2015, the entire contents of each of which are incorporated herein by reference.

CROSS REFERENCE TO RELATED APPLICATION

The present application is based on and incorporates herein by reference Japanese Patent Application No. 2015-000817 filed on Jan. 6, 2015.

TECHNICAL FIELD

The present disclosure relates to an accelerator device and a die device for the accelerator device while the die device is used for molding a resin member of the accelerator device.

BACKGROUND ART

Previously, there is known an accelerator device that controls an acceleration state of a vehicle according to an amount of depression of an accelerator pedal that is depressed by a driver of the vehicle. One type of accelerator device has a kickdown switch that contacts a support portion, which is fixed to a vehicle body, or an operable portion, which includes an accelerator pedal, when the driver depresses the accelerator pedal. For example, the patent literature 1 discloses an accelerator device that includes a support portion having an installation hole, into which a kickdown switch is installable.

However, in a case where an accelerator device, which does not have the kickdown switch because of its specification, is formed while using the support portion of the accelerator device of the patent literature 1, there is a possibility of that the kickdown switch is erroneously installed to the installation hole.

CITATION LIST

Patent Literature

PATENT LITERATURE 1: JP2003-507629A (corresponding to U.S. Pat. No. 6,666,106B1)

SUMMARY OF INVENTION

It is an objective of the present disclosure to provide an accelerator device that limits erroneous assembling of an unintended component, such as a kickdown switch, to the accelerator device. It is another objective of the present disclosure to provide a die device that is used for manufacturing of the above accelerator device.

According to the present disclosure, there is provided an accelerator device including:
a support portion that is installable to a vehicle body;
a shaft that is rotatably supported by the support portion;
an operable portion that is rotatable integrally with the shaft and is depressible by a driver;
a full opening limiting portion that is provided to one of the support portion and the operable portion, wherein the full opening limiting portion limits rotation of the operable portion in an accelerator opening direction when the full opening limiting portion contacts the other one of the support portion and the operable portion;
a recess that is formed in the one of the support portion and the operable portion and has a space, which opens toward the other one of the support portion and the operable portion;
a projection that extends from at least one of a side wall or a base wall of the recess and limits insertion of an unintended component into the recess;
an urging member that urges the operable portion to rotate the operable portion in an accelerator closing direction; and
a rotational angle sensing device that senses a rotational angle of the shaft relative to the support portion.

Furthermore, according to the present disclosure, there is provided a die device including a die that is operable to mold the recess and the projection of the accelerator device.

DESCRIPTION OF EMBODIMENTS

Figure 1:
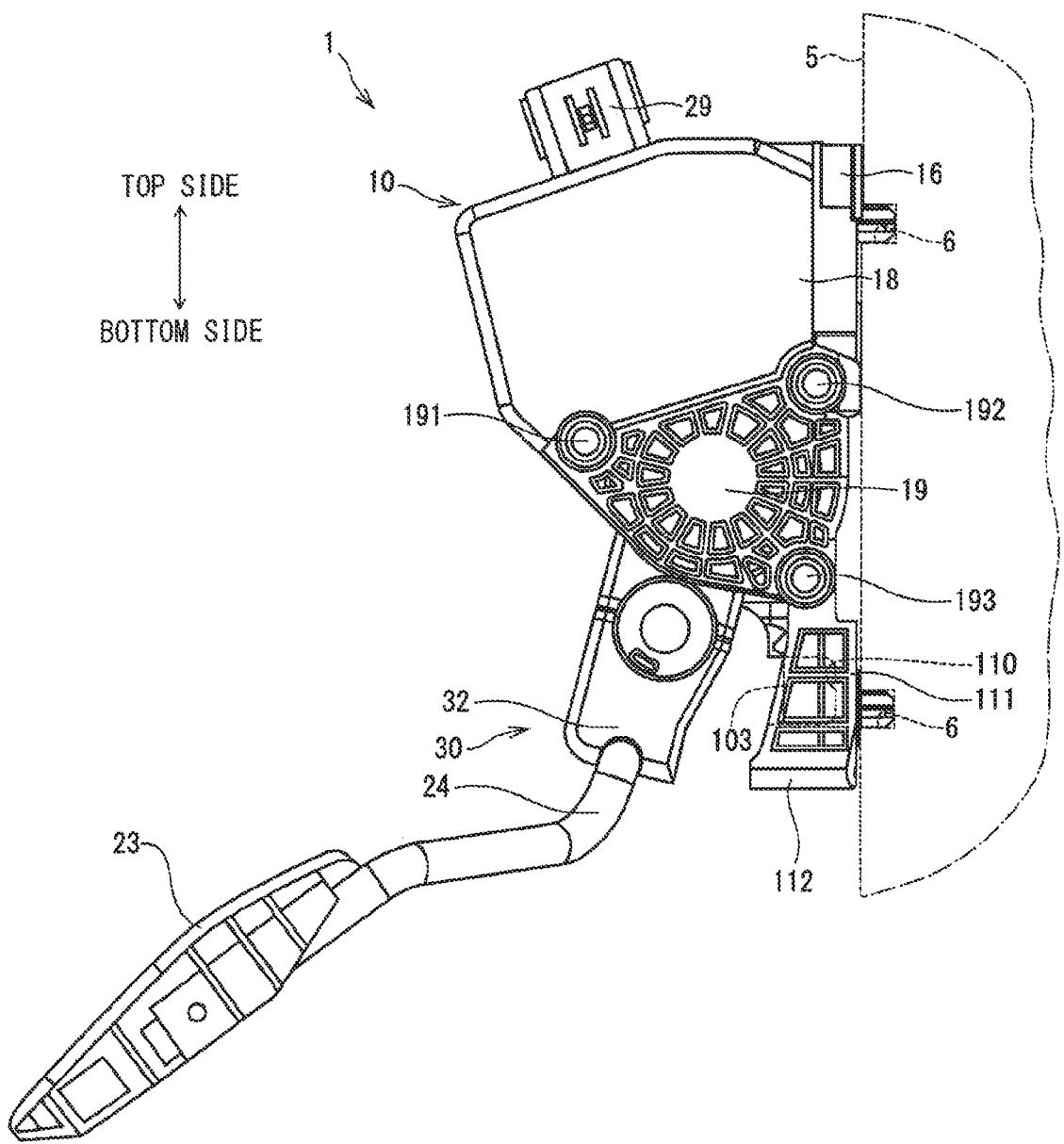
FIG. 1 is a schematic diagram of an accelerator device according to a first embodiment of the present disclosure.

Various embodiments of the present disclosure will be described with reference to the drawings.

First Embodiment

An accelerator device and a die device for the accelerator device according to a first embodiment of the present disclosure will be described with reference to FIGS. 1 to 8. The accelerator device 1 of the first embodiment is an input device that is operated by a driver of a vehicle to determine a valve opening degree of a throttle valve of a vehicle engine (not shown). The accelerator device 1 is of an electronic type and transmits an electric signal, which indicates an amount of depression of an accelerator pedal 23, to an electronic control device (not shown). The electronic control device drives the throttle valve through a throttle actuator (not shown) based on the amount of depression of the accelerator pedal 23 and/or another type(s) of information.

The accelerator device 1 includes an installation blocking portion (serving as a recess) 111, a rib (serving as a projection) 103, a full opening stopper (serving as a full opening limiting portion) 112, a first cover 18, a second cover 19, a shaft 20, an operable portion 30, a pedal spring (serving as an urging member (urging means)) 39, a rotational angle sensor (serving as a rotational angle sensing device (rotational angle sensing means) 25 and a hysteresis mechanism 40. Hereinafter, an upper side of FIGS. 1 to 3 will be referred to as a top side, and a lower side of FIGS. 1 to 3 will be referred to as a bottom side. However, the top-to-bottom direction of the accelerator device 1 should not be limited to this.

The support portion 10 includes a bearing portion 14, a front portion 17, a back portion 16 and an upper portion 15. The front portion 17 is joined to the bearing portion 14 and is placed on a projecting side of a pedal arm 24 of the accelerator device 1. The back portion 16 is opposed to the front portion 17. The upper portion 15 joins the bearing portion 14, the front portion 17 and the back portion 16 together at the top side of the accelerator device 1. The support portion 10 is resin molded integrally with the installation blocking portion 111, the rib 103 and the full opening stopper 112 as a one-piece body. Thus, after the molding, the installation blocking portion 111, the rib 103 and the full opening stopper 112 can be considered as a portion of the support portion 10. The support portion 10 includes an inside space 100 that receives the shaft 20, the pedal spring 39, a portion of the rotational angle sensor 25 and the hysteresis mechanism 40. A lower part of the support portion 10 has a communication hole 101 that communicates between the inside space 100 and an outside of the support portion 10 and corresponds to a movable range of the operable portion 30.

Figure 2:
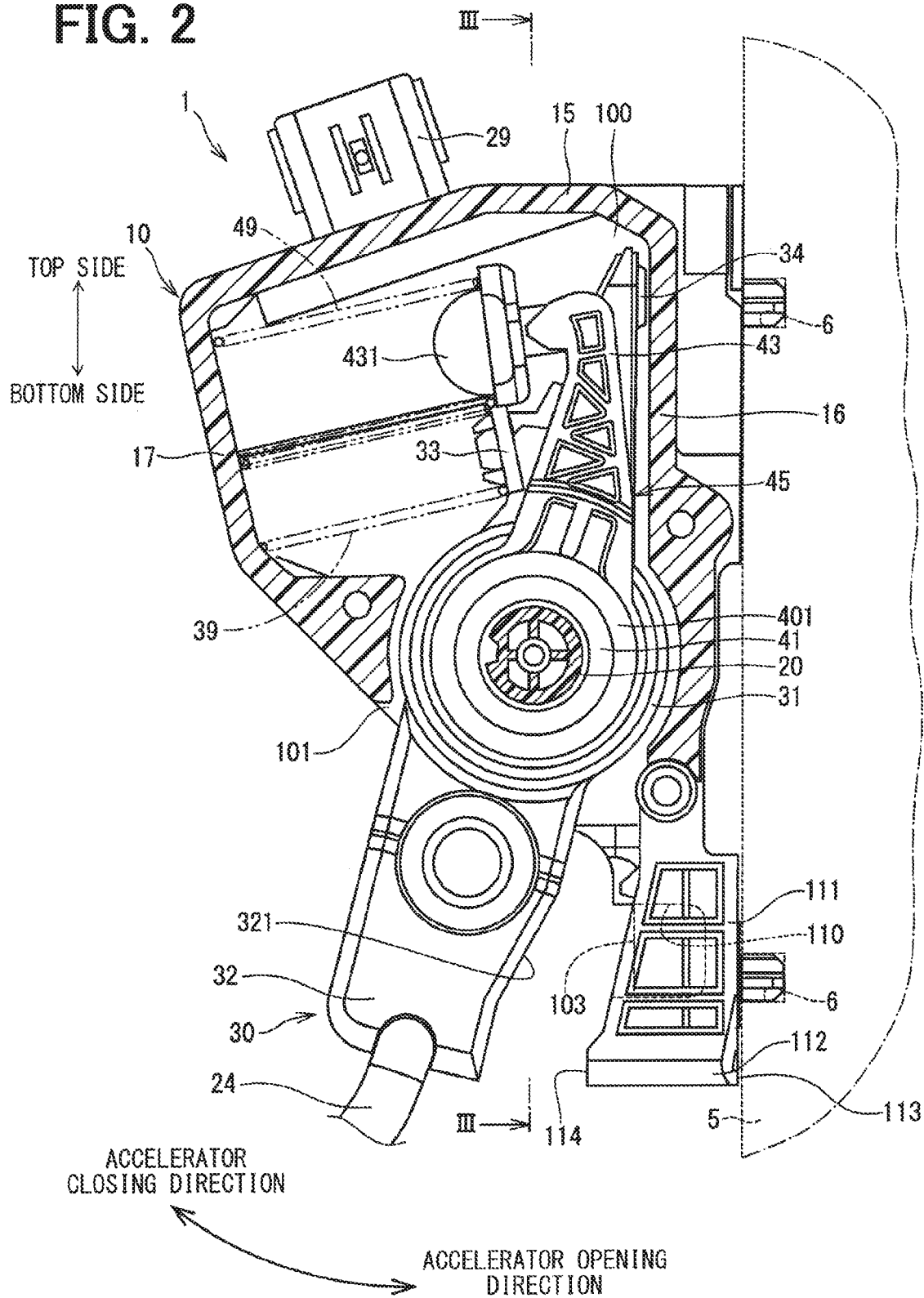
FIG. 2 is a cross sectional view of the accelerator device according to the first embodiment of the present disclosure.
Figure 3:
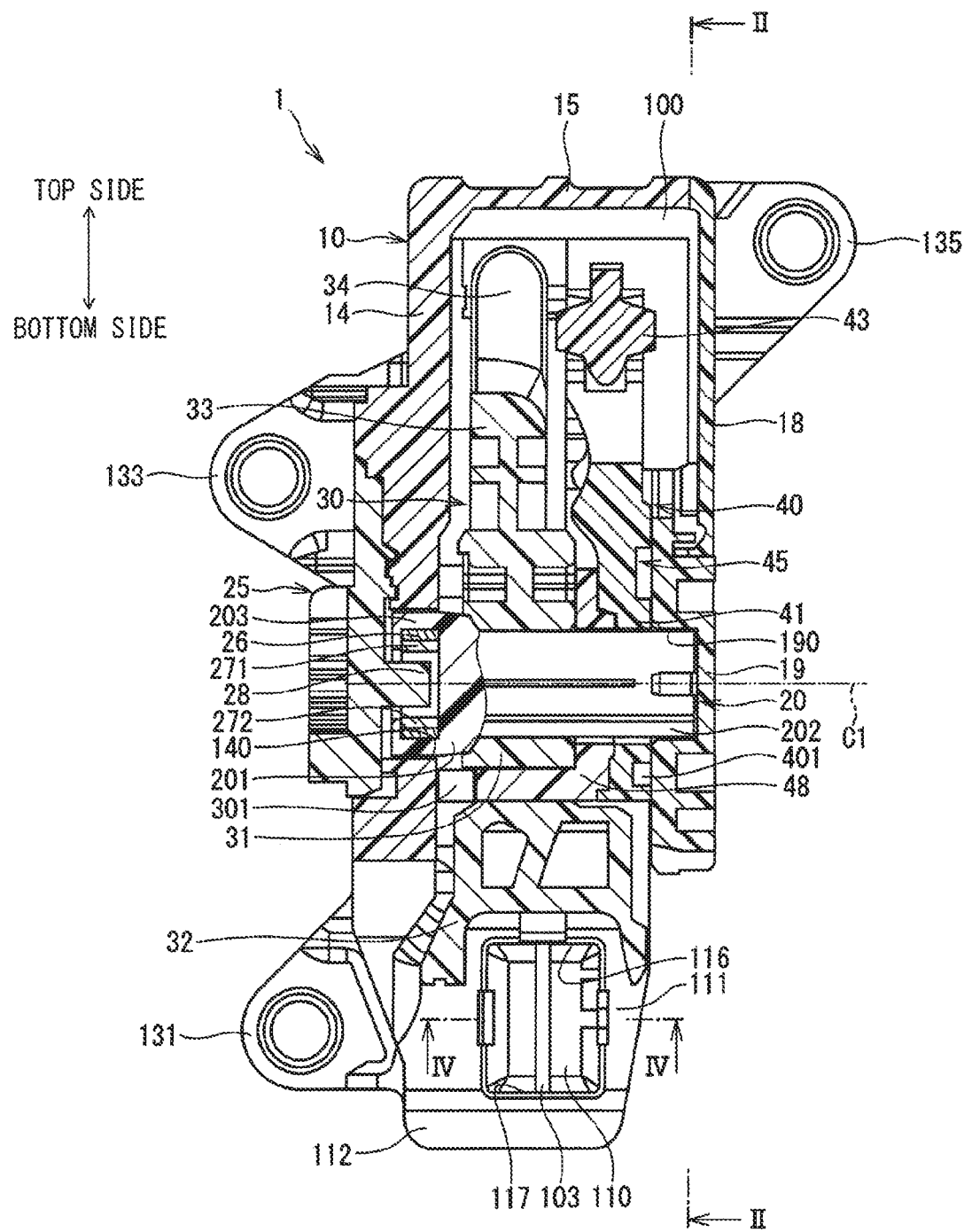
FIG. 3 is a cross sectional view taken along line in FIG. 2.

As shown in FIG. 3, three fixing bases 131, 133, 135 are formed al the support portion 10. Each of the fixing bases 131, 133, 135 includes a protrusion that protrudes from the fixing base 131, 133, 135 in a common direction. The accelerator device 1 is installed to the vehicle body 5 by fitting the protrusions of the fixing bases 131, 133, 135 into fitting holes 6 of the vehicle body 5 (see FIGS. 1 and 2).

The bearing portion 14 includes an opening, through which one end portion 201 of the shaft 20 is received. The bearing portion 14 is formed such that the shaft 20 is rotatable in the inside of the opening of the bearing portion 14. That is, an inner wall of the opening forms a bearing 140 that rotatably supports the one end portion 201 of the shaft 20.

The installation blocking portion 111 is placed on the bottom side of the back portion 16. As shown in FIGS. 1 and 2, the installation blocking portion 111 includes a space 110 that opens toward the operable portion 30 side. The rib 103 is formed in the space 110 that is shaped into a tubular form having a bottom.

Figure 4:
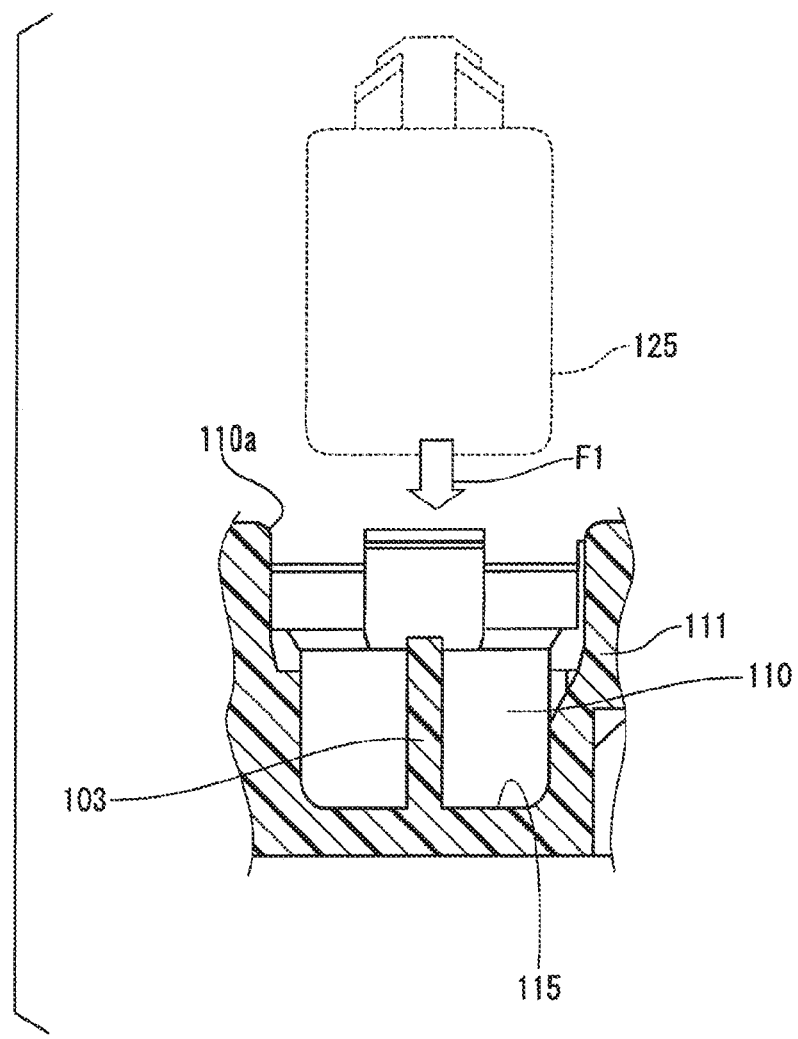
FIG. 4 is a cross sectional view taken along line IV-IV in FIG. 3.

As shown in FIG. 4, the rib 103 extends from a base wall 115 of the installation blocking portion 111, which forms the space 110, toward an opening 110a of the space 110. The rib 103 is formed such that the rib 103 connects between an inner wall (serving as one inner wall (side wall)) 116, which is located at the top side, and an inner wall (serving as another inner wall (side wall) 117, which is located at the bottom side. In this way, at the time of manufacturing the accelerator device 1, when someone is trying to install the kickdown switch 125 in the space 110 in a direction of a blank arrow F1 shown in FIG. 4, the rib 103 blocks the kickdown switch 125. Therefore, the kickdown switch 125 cannot be installed into the space 110.

The full opening stopper 112 is placed on the bottom side of the installation blocking portion 111 such that the full opening stopper 112 is contactable against the operable portion 30. When the full opening stopper 112 contacts the operable portion 30, rotation of the operable portion 30 and rotation of the shaft 20, which is rotated integrally with the operable portion 30, are limited at an accelerator full opening position. The accelerator full opening position is a position that is set such that a degree of depression of the operable portion 30, which is depressed by the driver of the vehicle, i.e., an accelerator opening degree becomes 100 [%] at this position.

The first cover 18 and the second cover 19 are positioned such that the first cover 18 and the second cover 19 are opposed to the bearing portion 14 and are parallel to the bearing portion 14.

The first cover 18 is engaged to the second cover 19 such that the first cover 18 contacts an end part of the upper portion 15, an end part of the back portion 16 and an end part of the front portion 17, which are located on an opposite side that is opposite from the bearing portion 14. The first cover 18 limits intrusion of a foreign object into the inside space 100.

The second cover 19 is fixed with bolts 191, 192, 193 to the end part of the back portion 16 and the end part of the front portion 17, which are located on the opposite side that is opposite from the bearing portion 14. The second cover 19 includes a recess, into which the other end portion 202 of the shaft 20 is inserted. That is, an inner wall of this recess forms a bearing 190 that rotatably supports the other end portion 202 of the shaft 20. Ridges and recesses, which are shaped into a mesh form, are formed at an outer wall of the second cover 19. The second cover 19 limits intrusion of a foreign object into the inside space 100.

The shaft 20 is placed to extend in the horizontal direction in the inside space 100. A sensor receiving recess 203, which receives a sensing element of the rotational angle sensor 25, is formed at the one end portion 201 of the shaft 20.

The shaft 20 is rotated within a predetermined rotational angle range, which is from an accelerator full closing position to the accelerator full opening position, according to a torque inputted from the operable portion 30 in response to a depressing operation of the operable portion 30 executed by the driver of the vehicle. The accelerator full closing position is a position that is set such that the degree of depression of the operable portion 30, which is depressed by the driver of the vehicle, i.e., the accelerator opening degree becomes 0 [%] at this position.

As shown in FIG. 2, a rotational direction, in which the operable portion 30 is rotated from the accelerator full closing position toward the accelerator full opening position, will be referred to an accelerator opening direction. Furthermore, a rotational direction, in which the operable portion 30 is rotated from the accelerator full opening position toward the accelerator full closing position, will be referred to as an accelerator closing direction.

The operable portion 30 includes the accelerator pedal 23, the pedal arm 24, a pedal boss 31, an arm connection 32, a pedal spring receiver 33, and a full closing stopper 34. The pedal boss 31, the arm connection 32, the pedal spring receiver 33 and the full closing stopper 34 are made of resin and are formed integrally as a one-piece body.

The accelerator pedal 23 is joined to one end portion of the pedal arm 24. The other end portion of the pedal arm 24 is fixed to an end portion of the arm connection 32. The accelerator pedal 23 converts the pressing motion of the accelerator pedal 23 by the driver of the vehicle into a rotational torque that is exerted in the rotational direction about the rotational axis C1 of the shaft 20, and this rotational torque is transmitted from the accelerator pedal 23 to the shaft 20.

When the accelerator pedal 23 is rotated in the accelerator opening direction, a rotational angle of the shaft 20, which is measured from the accelerator full closing position in the accelerator opening direction, is increased. Thereby, the accelerator opening degree, which corresponds to this rotational angle of the shaft 20, is increased. Furthermore, when the accelerator pedal 23 is rotated in the accelerator closing direction, the rotational angle of the shaft 20 is decreased. Thereby, the accelerator opening degree is decreased.

The pedal boss 31 is shaped into a ring form. The pedal boss 31 is formed between the bearing portion 14 and the second cover 19 and is fixed to an outer wall of the shaft 20 by, for example, press fitting.

Primary helical teeth (not shown) are formed integrally at a side surface of the pedal boss 31, which is located on the second cover 19 side. The primary helical teeth are arranged one after another at equal intervals in the circumferential direction. The primary helical teeth project such that an amount of projection of each of the primary helical teeth, which projects toward the hysteresis rotatable member 45 of the hysteresis mechanism 40, is progressively increased in the accelerator closing direction, and a tilt surface is formed at a distal end part of each of the primary helical teeth such that the tilt surface progressively approaches the hysteresis rotatable member 45 in the accelerator closing direction.

A first frictional member 301 is placed at the side surface of the pedal boss 31, which is located on the bearing portion 14 side. The first frictional member 301 is shaped into a ring form and is placed on the radially outer side of the shaft 20 at a location that is between the pedal boss 31 and an inner wall of the bearing portion 14. When the pedal boss 31 is urged in a direction away from the hysteresis rotatable member 45, i.e., in a direction toward the bearing portion 14, the pedal boss 31 is frictionally engaged with the first frictional member 301. A frictional force between the pedal boss 31 and the first frictional member 301 functions as a rotational resistance against the rotation of the pedal boss 31.

One end of the arm connection 32 is joined to a peripheral surface of the pedal boss 31, which is located on the radially outer side, and the other end of the arm connection 32 extends through the communication hole 101 toward the bottom side of the support portion 10. The other end of the arm connection 32 is connected to the other end portion of the pedal arm 24. An end surface 321 of the arm connection 32, which is located on the accelerator opening direction side, is contactable with a contact surface 114 of the full opening stopper 112.

One end of the pedal spring receiver 33 is joined to the peripheral surface of the pedal boss 31, which is located on the radially outer side, and the other end of the pedal spring receiver 33 extends in an upward direction in the inside space 100. One end portion of the pedal spring 39 is engaged to the pedal spring receiver 33.

The pedal spring 39 is, for example, a coil spring. The other end portion of the pedal spring 39 contacts an inner wall of the front portion 17. The pedal spring 39 urges the operable portion 30 in the accelerator closing direction. An urging force of the pedal spring 39, which is exerted to the operable portion 30, is increased when the rotational angle of the operable portion 30, i.e., the rotational angle of the shaft 20 is increased. Furthermore, this urging force is set such that the urging force can return the operable portion 30 and the shaft 20 to the accelerator full closing position regardless of the rotational angle of the operable portion 30.

The full closing stopper 34 is formed to extend further from the pedal spring receiver 33 in the upward direction in the inside space 100. The full closing stopper 34 limits the rotation of the operable portion 30 in the accelerator closing direction when the full closing stopper 34 contacts the inner wall of the back portion 16.

The rotational angle sensor 25 includes a yoke 26, a pair of magnets 271, 272 and a Hall element 28. Magnetic poles of the magnet 271 are different from magnetic poles, respectively, of the magnet 272. The yoke 26 is made of a magnetic material and is shaped into a tubular form. The yoke 26 is fixed to an inner wall of the sensor receiving recess 203 of the shaft 20. The magnets 271, 272 are opposed to each other about the rotational axis C1 of the shaft 20 in the radial direction of the yoke 26 and are fixed to an inner wall of the yoke 26. The Hall element 28 is placed between the magnet 271 and the magnet 272.

When a magnetic field is applied to the Hall element 28, through which an electric current flows, a voltage is generated in the Hall element 28. A density of a magnetic flux, which penetrates through the Hall element 28, is changed when the magnets 271, 272 are rotated together with the shaft 20 about the rotational axis C1 of the shaft 20. A value of the voltage generated at the Hall element 28 changes in proportional to the density of the magnetic flux that penetrates through the Hall element 28. The rotational angle sensor 25 senses the voltage generated in the Hall element 28 and thereby senses a relative rotational angle between the Hall element 28 and the magnets 271, 272, i.e., a rotational angle of the shaft 20. The rotational angle sensor 25 transmits an electric signal, which indicates the sensed rotational angle, to an external electronic control device (not shown) through an external connector 29 that is formed at an upper portion of the accelerator device 1.

The hysteresis mechanism 40 includes the hysteresis rotatable member 45, an intermediate member 48, a second frictional member 401 and a hysteresis spring 49. The hysteresis rotatable member 45 includes a hysteresis boss 41 and a hysteresis spring receiver 43, which are formed integrally as a one-piece body.

The hysteresis boss 41 is placed between the pedal boss 31 and the inner wall of the second cover 19 on the radially outer side of the shaft 20. The hysteresis boss 41 is shaped into a ring form and is rotatable relative to the shaft 20 and the pedal boss 31. Furthermore, the hysteresis boss 41 is movable toward or away from the pedal boss 31.

The hysteresis spring receiver 43 extends in the upward direction from the hysteresis boss 41 in the inside space 100. The hysteresis spring receiver 43 has an engaging part 431 at one end part of the hysteresis spring receiver 43 that is opposite from a side where the hysteresis spring receiver 43 is connected to the hysteresis boss 41. One end part of the hysteresis spring 49 is engaged to the engaging part 431.

The intermediate member 48 is placed between the hysteresis boss 41 and the pedal boss 31. The intermediate member 48 is rotatable integrally with the hysteresis rotatable member 45 relative to the shaft 20 and the pedal boss 31. Furthermore, the intermediate member 48 is movable toward or away from the pedal boss 31.

Secondary helical teeth (not shown) are formed integrally with the intermediate member 48 at a side surface of the intermediate member 48, which is located on the pedal boss 31 side. The secondary helical teeth are arranged one after another at equal intervals in the circumferential direction. The secondary helical teeth project such that an amount of projection of each of the secondary helical teeth, which projects toward the pedal boss 31, is progressively increased in the accelerator opening direction, and a tilt surface is formed at a distal end part of each of the secondary helical teeth such that the tilt surface progressively approaches the hysteresis boss 41 in the accelerator opening direction.

The primary helical teeth and the secondary helical teeth can conduct the rotation between the pedal boss 31, which is located on one side, and the intermediate member 48 and the hysteresis boss 41, which are located on the other side, through abutment between the tilt surfaces of the primary helical teeth and the tilt surfaces of the secondary helical teeth. That is, the rotation of the pedal boss 31 in the accelerator opening direction can be transmitted to the hysteresis boss 41 through the primary helical teeth and the secondary helical teeth. Furthermore, the rotation of the hysteresis boss 41 in the accelerator closing direction can be transmitted to the pedal boss 31 through the secondary helical teeth and the primary helical teeth.

The primary helical teeth and the secondary helical teeth space the pedal boss 31 away from the intermediate member 48 and the hysteresis boss 41 through the engagement between the tilt surfaces of the primary helical teeth and the tilt surfaces of the secondary helical teeth when the rotational angle of the pedal boss 31 is on the accelerator full opening position side of the accelerator full closing position. At this time, the primary helical teeth urge the pedal boss 31 toward the bearing portion 14 side with a force that is increased in response to an increase in the rotational angle of the pedal boss 31 from the accelerator full closing position. Furthermore, the secondary helical teeth urge the hysteresis boss 41 toward the second cover 19 side with a force that is increased in response to an increase in the rotational angle of the pedal boss 31 from the accelerator full closing position.

The second frictional member 401 is shaped into a ring form and is placed between the hysteresis rotatable member 45 and the inner wall of the second cover 19 on the radially outer side of the shaft 20. When the hysteresis rotatable member 45 is urged in a direction away from the pedal boss 31, i.e., in a direction toward the second cover 19, the hysteresis rotatable member 45 is frictionally engaged with the second frictional member 401. A frictional force between the hysteresis rotatable member 45 and the second frictional member 401 serves as a rotational resistance against the rotation of the hysteresis rotatable member 45.

The hysteresis spring 49 is, for example, a coil spring. The other end part of the hysteresis spring 49 contacts the inner wall of the front portion 17. The hysteresis spring 49 urges the hysteresis rotatable member 45 in the accelerator closing direction. An urging force of the hysteresis spring 49 is increased when the rotational angle of the hysteresis boss 41 is increased. The torque, which is applied to the hysteresis boss 41 through the urging by the hysteresis spring 49, is transmitted to the pedal boss 31 through the secondary helical teeth and the primary helical teeth.

Figure 5:
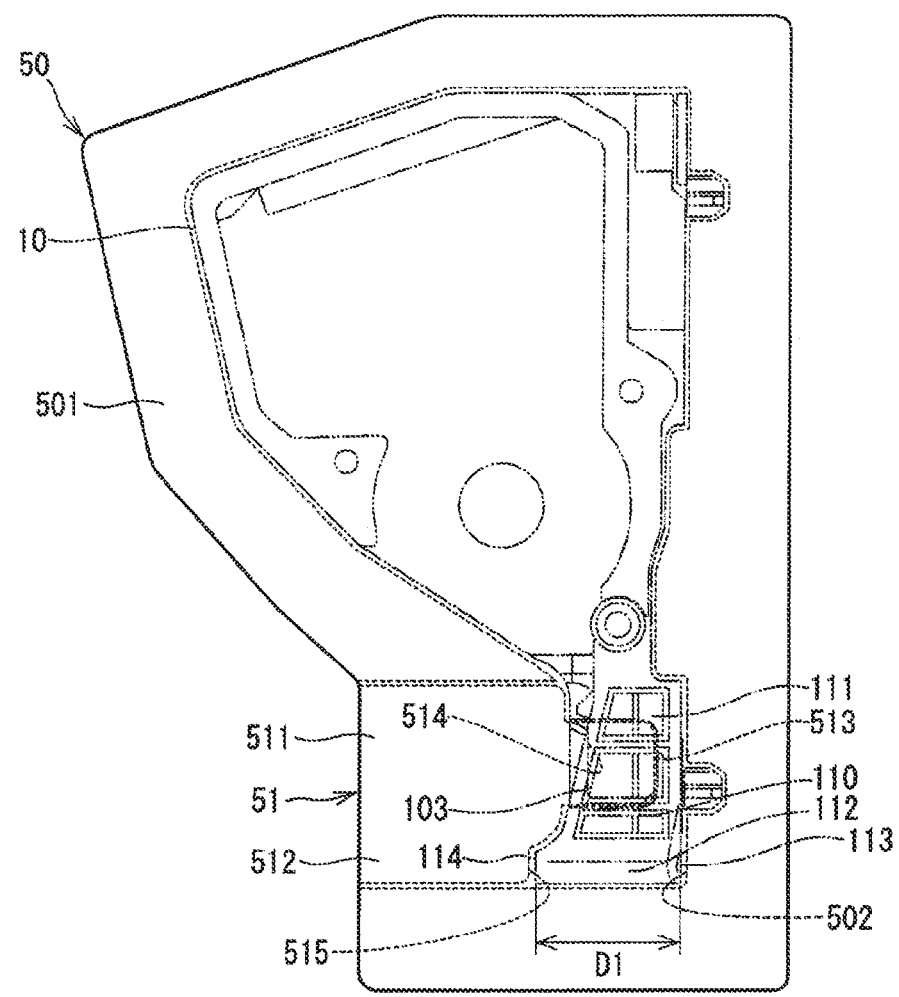
FIG. 5 is a schematic diagram of a die device for the accelerator device while the die device is used for molding a support portion, an installation blocking portion, a rib, and a full opening stopper of the accelerator device according to the first embodiment of the present disclosure.

A die device 50, which is used to mold the support portion 10, the installation blocking portion 111, the rib 103 and the full opening stopper 112 of the accelerator device 1, will be described with reference to FIG. 5. FIG. 5 is a schematic diagram of the die device 50. In FIG. 5, the support portion 10, the installation blocking portion 111, the rib 103 and the full opening stopper 112 of the accelerator device 1 are indicated by a dot-dot dash line.

The die device 50 includes a support portion molding die 501 and a full opening stopper molding die 51. The full opening stopper molding die 51 serves as a rib forming die (also referred to as a projection molding die or a first die). The support portion molding die 501 and the full opening stopper molding die 51 are formed by separate members, respectively.

The support portion molding die 501 molds the support portion 10.

The full opening stopper molding die 51 includes a first molding portion 511, which molds the installation blocking portion 111, and a second molding portion 512, which molds the full opening stopper 112. The first molding portion 511 includes a projection 513, which forms the space 110 of the accelerator device 1. An end part of projection 513 includes a groove 514 for molding the rib 103.

The die device 50 of the first embodiment allows replacement of the full opening stopper molding die 51 with a full opening stopper molding die 52, which has a different shape in comparison to the full opening stopper molding die 51 and serves as a rib non-forming die (also referred to as a projection non-forming die or a second die) to enable installation of the kickdown switch 125 at a location, which corresponds to the space 110 of the accelerator device 1. In the following discussion, the accelerator device 2, which has the kickdown switch 125, will be first described with reference to FIGS. 6 and 7. In the following discussion, components, which are substantially the same as those of the accelerator device 1, are indicated by the same reference signs and will not be described redundantly for the sake of simplicity. An upper side of FIG. 6 will be described as a top side, and a lower side of FIG. 6 will be described as a bottom side.

The accelerator device 2 includes the support portion 10, a kickdown switch installation portion 121, a full opening stopper 122, the kickdown switch 125, the first cover 18, the second cover 19, the shaft 20, the operable portion 30, the pedal spring 39, the rotational angle sensor 25 and the hysteresis mechanism 40.

The kickdown switch installation portion 121 is placed at the bottom side of the back portion 16. The kickdown switch installation portion 121 includes an installation hole 120, into which the kickdown switch 125 (see FIG. 7) is installable. The kickdown switch 125 notifies the driver that the rotational angle of the accelerator pedal 23 relative to the support portion 10 is the full opening position when the kickdown switch 125 contacts the operable portion 30. The kickdown switch 125 is installable into the installation hole 120 in a direction of a blank arrow F2 shown in FIG. 7.

Figure 6:
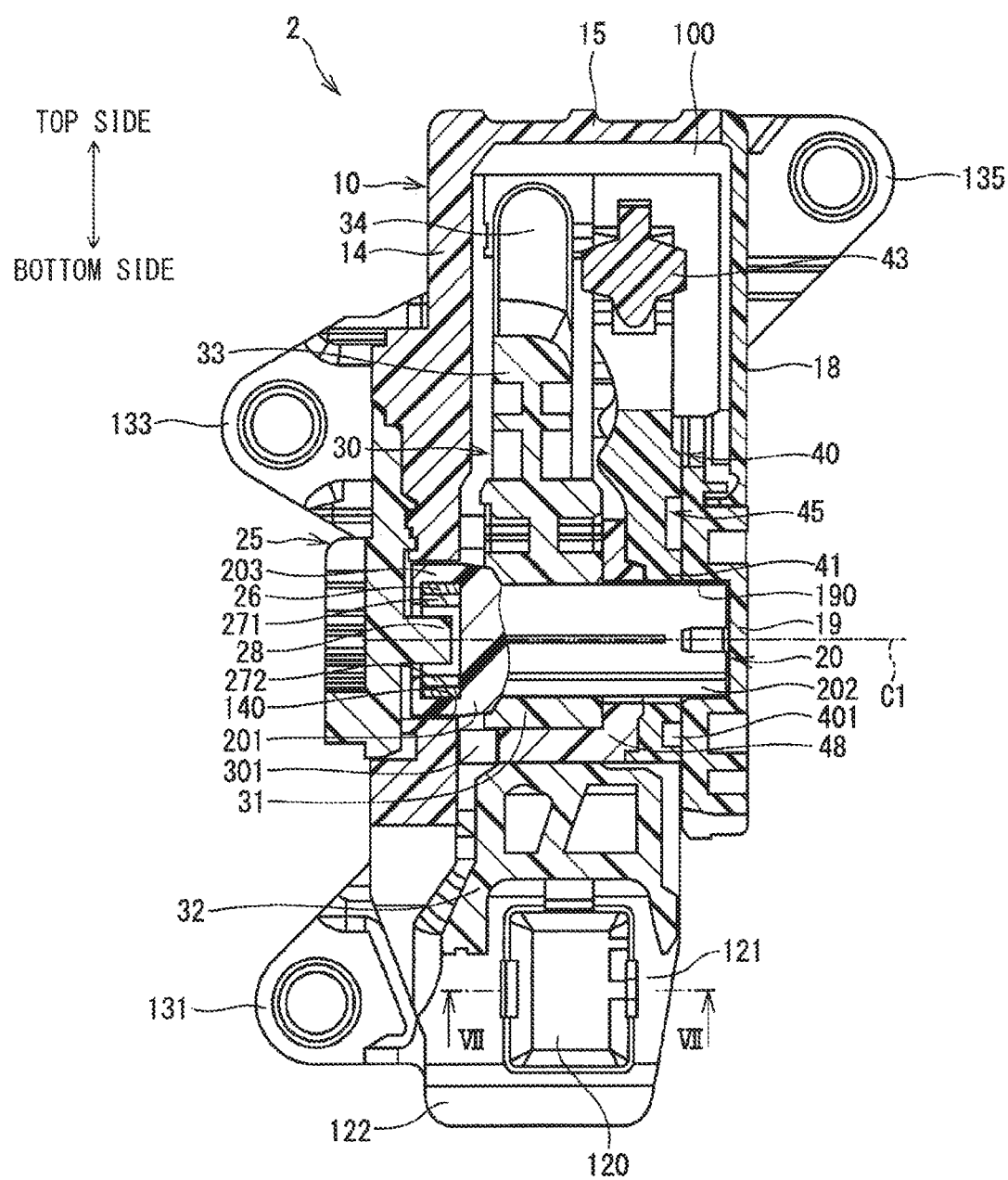
FIG. 6 is a cross sectional view of the accelerator device that has a kickdown switch because of its specification according to the first embodiment of the present disclosure.
Figure 7:
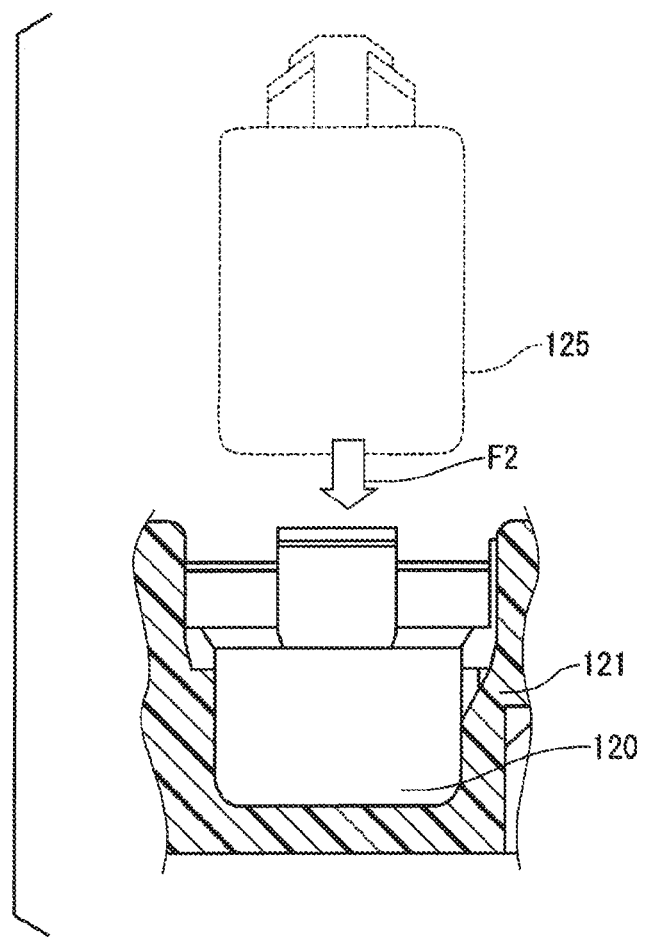
FIG. 7 is a cross sectional view taken along line VII-VII in FIG. 6.

As shown in FIG. 6, the full opening stopper 122 is formed at the bottom side of the kickdown switch installation portion 121 in such a manner that the full opening stopper 122 is contactable with the operable portion 30. When the full opening stopper 122 contacts the operable portion 30, the rotation of the operable portion 30 and the rotation of the shaft 20, which is rotated integrally with the operable portion 30, are limited at the accelerator full opening position.

The shape of the full opening stopper 122 of the accelerator device 2, which serves as the full opening limiting portion molded with the rib non-forming die, is different from the shape of the full opening stopper 112 of the accelerator device 1, which serves as the full opening limiting portion molded with the rib forming die. Specifically, the full opening stopper 122 is molded such that a length D2 of the full opening stopper 122 (see FIG. 8) measured between an end surface 123, which is contactable with the vehicle body 5, and a contact surface 124, which is contactable with the operable portion 30, is smaller than a length D1 of the full opening stopper 112 (see FIG. 5) measured between an end surface 113, which is contactable with the vehicle body 5, and a contact surface 114, which is contactable with the operable portion 30. The end surface 123 of the full opening stopper 122 serves as an opposite surface that is opposite from the contact surface of the full opening limiting portion that is molded with the rib non-forming die. The contact surface 124 serves as the contact surface of the full opening limiting portion molded with the rib non-forming die. The end surface 113 of the full opening stopper 112 serves as an opposite surface that is opposite from the contact surface of the full opening limiting portion that is molded with the rib forming die. The contact surface 114 serves as the contact surface of the full opening limiting portion molded with the rib forming die.

Figure 8:
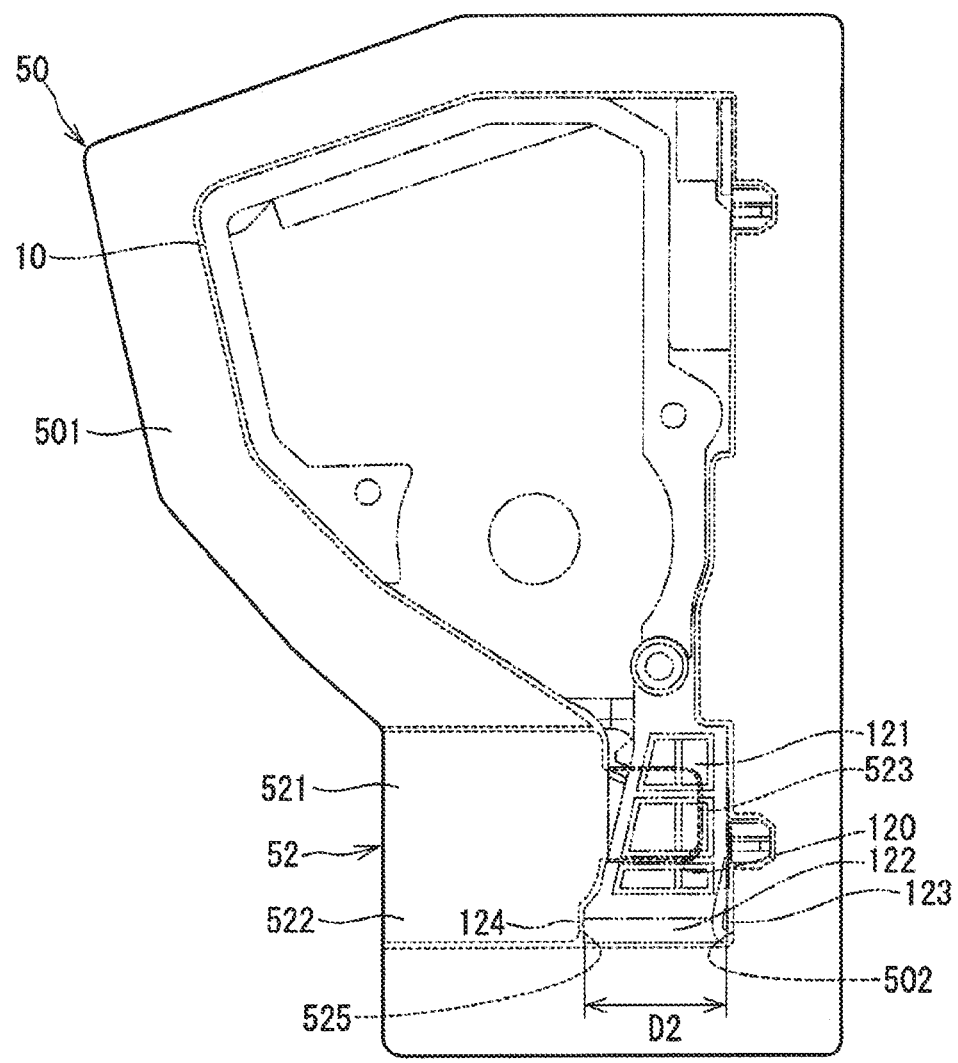
FIG. 8 is a schematic diagram of a die device for the accelerator device used for molding a support portion, a kickdown switch installation portion, and a full opening stopper of the accelerator device that has the kickdown switch because of its specification according to the first embodiment of the present disclosure.

Next, the die device 50, which molds the support portion 10, the kickdown switch installation portion 121 and the full opening stopper 122 of the accelerator device 2, will be described with reference to FIG. 8. FIG. 8 is a schematic view of the die device 50, which molds the support portion 10, the kickdown switch installation portion 121 and the full opening stopper 122 of the accelerator device 2. In FIG. 8, the support portion 10, the kickdown switch installation portion 121 and the full opening stopper 122 of the accelerator device 2 are indicated by a dot-dot dash line.

The die device 50 includes a support portion molding die 501 and a full opening stopper molding die 52. The support portion molding die 501 and the full opening stopper molding die 52 are formed by separate members, respectively.

The full opening stopper molding die 52 includes a first molding portion 521, which molds the kickdown switch installation portion 121, and a second molding portion 522, which molds the full opening stopper 122. The first molding portion 521 includes a projection 523, which forms the installation hole 120.

The second molding portion 522 is formed such that when the full opening stopper molding die 52 is combined with the support portion molding die 501, a distance measured between an end surface 525 of the molding die 52, which molds the contact surface 124, and an end surface 502 of the support portion molding die 501, which molds the contact surface 123, serves as the length D2. Here, the end surface 525 serves as an end surface of the rib non-forming die that molds the contact surface of the full opening limiting portion, which is molded with the rib non-forming die. The end surface 502 serves as an end surface of the rib non-forming die that molds the opposite surface of the full opening limiting portion, which is opposite from the contact surface of the full opening limiting portion that is molded with the rib non-forming die. In contrast, the second molding portion 512 of the die device 50 for the accelerator device 1 is formed such that when the full opening stopper molding die 51, which molds the installation blocking portion 111, the rib 103, and the full opening stopper 112 of the accelerator device 1, is combined with the support portion molding die 501, a distance measured between an end surface 515 of the full opening stopper molding die 51, which molds the contact surface 114, and an end surface 502 of the support portion molding die 501, which molds the end surface 113, serves as the length D1 that is larger than the length D2. Here, the end surface 515 serves as an end surface of the rib forming die, which molds the contact surface of the full opening limiting portion that is molded with the rib forming die. The end surface 502 serves as an end surface of the rib forming die, which molds the opposite surface of the full opening limiting portion that is opposite from the contact surface of the full opening limiting portion molded with the rib forming die.

Next, the operation of the accelerator device 1 will be described.

When the accelerator pedal 23 is depressed, the operable portion 30 is rotated together with the shaft 20 about the rotational axis C1 of the shaft 20 in response to the pedal force applied to the accelerator pedal 23. At this time, in order to rotate the operable portion 30 and the shaft 20, it is necessary to generate the pedal force that is larger than a sum of the torque, which is exerted by the urging forces of the pedal spring 39 and the hysteresis spring 49, and the resistance torque, which is exerted by the frictional forces of the first frictional member 301 and the second frictional member 401.

For example, in order to maintain the depressed state of the accelerator pedal 23 upon depression of the accelerator pedal 23 by the driver, it is only required to apply the pedal force that is larger than a difference between the torque, which is exerted by the urging forces of the pedal spring 39 and the hysteresis spring 49, and the resistance torque, which is exerted by the frictional forces of the first frictional member 301 and the second frictional member 401. That is, the driver may reduce the pedal force in the case where the depressed state of the accelerator pedal 23 is maintained upon depression of the accelerator pedal 23.

Furthermore, in order to return the depressed accelerator pedal 23 toward the accelerator full closing position, the driver applies the pedal force that generates a torque smaller than the difference between the torque, which is exerted by the urging forces of the pedal spring 39 and the hysteresis spring 49, and the resistance torque, which is exerted by the frictional forces of the first frictional member 301 and the second frictional member 401. Here, in a case where the depressed accelerator pedal 23 is rapidly returned to the accelerator full closing position, it is only required to stop the depression of the accelerator pedal 23. Therefore, the driver will not experience a burden. In contrast, in a case where the depressed accelerator pedal 23 is gradually returned to the accelerator full closing position, it is required to keep applying a predetermined pedal force to the accelerator pedal 23. At this time, the pedal force, which is required at the time of gradually returning the accelerator pedal 23, is a relatively small value.

(a) In the accelerator device 1 of the first embodiment, the rib 103 is formed in the space 110 of the installation blocking portion 111. The rib 103 is formed to extend from the base wall 115 toward the operable portion 30. Thereby, when someone is trying to install the kickdown switch into the space 110, the rib 103 blocks the installation of the kickdown switch into the space 110. Thus, the kickdown switch cannot be installed into the space 110. As a result, the erroneous installation of the kickdown switch in the accelerator device 1 can be limited.

(b) At the time of resin molding the support portion 10, the installation blocking portion 111, the rib 103 and the full opening stopper 112 of the accelerator device 1 that does not have the kickdown switch because of its specification, the rib 103 is molded in the inside of the installation blocking portion 111 instead of filling the space 110 with the resin for the purpose of preventing the erroneous installation of the kickdown switch into the space 110. Thus, the excess amount of resin in the installation blocking portion 111 of the accelerator device 1 is reduced, and thereby generation of, for example, a void is limited. As a result, it is possible to limit generation of molding defect.

(c) Furthermore, the rib 103 is formed to join between the inner wall 116 located at the top side and the inner wall 117 located at the bottom side in the space 110. Thereby, the strength of the installation blocking portion 111 in the top-to-bottom direction can be increased.

(d) The die device 50 of the first embodiment enables the exchange of the full opening stopper molding die, which should be exchanged depending on whether the kickdown switch is present in the subject accelerator device, while the support portion molding die 501 is used commonly.

In the case of the accelerator device 1 that does not have the kickdown switch because of its specification, the support portion 10, the installation blocking portion 111, the rib 103 and the full opening stopper 112 are molded with the die device 50, which is the combination of the support portion molding die 501 and the full opening stopper molding die 51. In the case of the accelerator device 2 that has the kickdown switch 125 because of its specification, the support portion 10, the kickdown switch installation portion 121 and the full opening stopper 122 are molded with the die device 50, which is the combination of the support portion molding die 501 and the full opening stopper molding die 52. Thereby, in the case of the accelerator device 1 that does not have the kickdown switch because of its specification, it is possible to limit the erroneous installation of the kickdown switch even in the case where the portion of the support portion 10 of the accelerator device 2, which has the kickdown switch 125 because of its specification, is commonly used at the time of executing the exchange of the portion of the die device 50.

Furthermore, the length of the full opening stopper differs between the accelerator device 1 and the accelerator device 2 because the two full opening stopper molding dies are provided, and the corresponding one of these two full opening stopper molding dies is selected and is used in the die device 50 depending on whether the kickdown switch is present. The reason why the length of the full opening stopper differs between the accelerator device 1 and the accelerator device 2 will be hereinafter described.

In view of the driveability of the vehicle, it is desirable to reduce the amount of stroke of the accelerator pedal 23 measured from a rotational angle of the accelerator pedal 23 at the time of outputting the signal of the rotational angle sensor 25, which indicates the rotational angle of the accelerator pedal 23 in the full opening position, to the rotational angle of the accelerator pedal 23 at the time of contacting the accelerator pedal 23 to the full opening stopper. The amount of stroke of the accelerator device 2, which has the kickdown switch 125 because of its specification, is increased by the amount that is required for contacting of the accelerator pedal 23 to the kickdown switch 125 in comparison to the amount of stroke of the accelerator device 1, which does not have the kickdown switch because of its specification. Thus, it is required to change the length measured from the end surface of the full opening stopper, which is contactable with the vehicle body 5, to the end surface of the full opening stopper, which is contactable with the operable portion 30, depending on whether the kickdown switch is present in the accelerator device. In the case where the support portion and the full opening stopper are molded integrally as a one-piece body, a plurality of one-piece dies needs to be prepared to change the length of the full opening stopper depending on whether the kickdown switch is present.

(e) In the case of the die device 50 for the accelerator device 1 according to the first embodiment, the full opening stopper molding die can be exchanged depending on whether the kickdown switch is present while the support portion molding die 501 is commonly used. In this way, it is possible to mold various shapes of full opening stoppers by only exchanging the full opening stopper molding die. Thus, it is possible to mold the full opening stopper in such a manner that the driveability of the vehicle is unchanged and is kept to be the best depending on whether the kickdown switch is present.

(f) The accelerator devices 1, 2, in each of which the support portion 10 and the full opening stopper are molded integrally as the one-piece body through use of the die device 50, are manufactured by using the common support portion molding die 501, which is common to the accelerator devices 1, 2. In this way, the costs of the dies can be reduced, and the manufacturing costs of the accelerator device 1, 2 can be reduced.

Second Embodiment

Next, an accelerator device according to a second embodiment of the present disclosure will be described with reference to FIG. 9. The second embodiment differs from the first embodiment with respect to the shape of the rib. In the following discussion, components, which are substantially the same as those of the first embodiment, are indicated by the same reference signs and will not be described redundantly for the sake of simplicity. An upper side of FIG. 9 will be described as a top side, and a lower side of FIG. 6 will be described as a bottom side.

Figure 9:
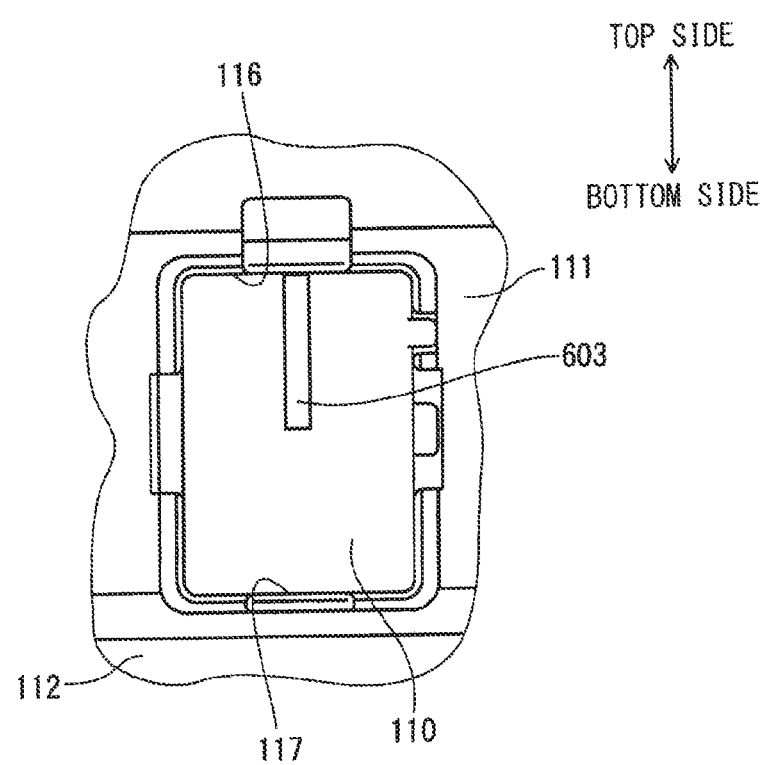
FIG. 9 is a partial enlarged view of an accelerator device according to a second embodiment of the present disclosure.

FIG. 9 indicates an enlarged view of the installation blocking portion 111 of the accelerator device according to the second embodiment.

A rib 603 is formed in the space 110 of the installation blocking portion 111. The rib 603 extends from the inner wall 116 at the top side to generally a center of the space 110. Thereby, the second embodiment can achieve the advantages (a), (b), (d) to (f) of the first embodiment and can reduce the amount of required resin that is required at the time of molding the rib in comparison to the first embodiment.

Third Embodiment

Next, an accelerator device according to a third embodiment of the present disclosure will be described with reference to FIG. 10. The third embodiment differs from the first embodiment with respect to the shape of the rib. In the following discussion, components, which are substantially the same as those of the first embodiment, are indicated by the same reference signs and will not be described redundantly for the sake of simplicity. An upper side of FIG. 10 will be described as a top side, and a lower side of FIG. 10 will be described as a bottom side.

Figure 10:
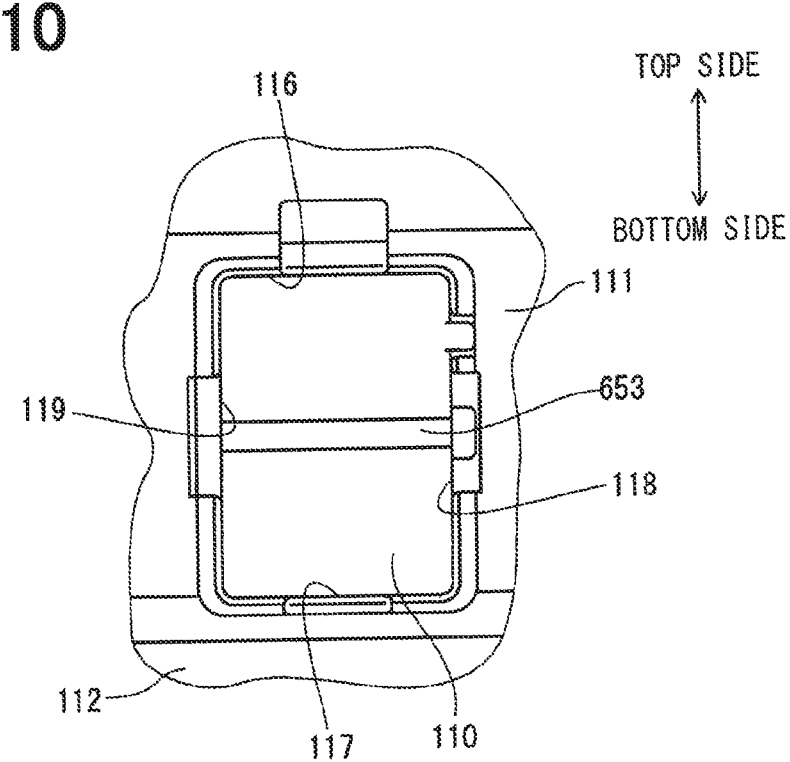
FIG. 10 is a partial enlarged view of an accelerator device according to a third embodiment of the present disclosure.

FIG. 10 indicates an enlarged view of the installation blocking portion 111 of the accelerator device according to the third embodiment.

A rib 653 is formed in the space 110 of the installation blocking portion 111. The rib 653 is formed to join between an inner wall 118 and an inner wall 119. The inner wall 118 is one inner wall (side wall) of the space 110 that is generally perpendicular to the top-to-bottom direction, and the inner wall 119 is another inner wall (side wall) of the space 110 that is generally perpendicular to the top-to-bottom direction and is opposed to the inner wall 118. Thereby, the third embodiment can achieve the advantages (a), (b), (d) to (f) of the first embodiment and can improve the strength of the installation blocking portion 111 in a horizontal direction.

Fourth Embodiment

Next, an accelerator device according to a fourth embodiment of the present disclosure will be described with reference to FIG. 11. The fourth embodiment differs from the first embodiment with respect to the shape of the rib. In the following discussion, components, which are substantially the same as those of the first embodiment, are indicated by the same reference signs and will not be described redundantly for the sake of simplicity. An upper side of FIG. 11 will be described as a top side, and a lower side of FIG. 11 will be described as a bottom side.

Figure 11:
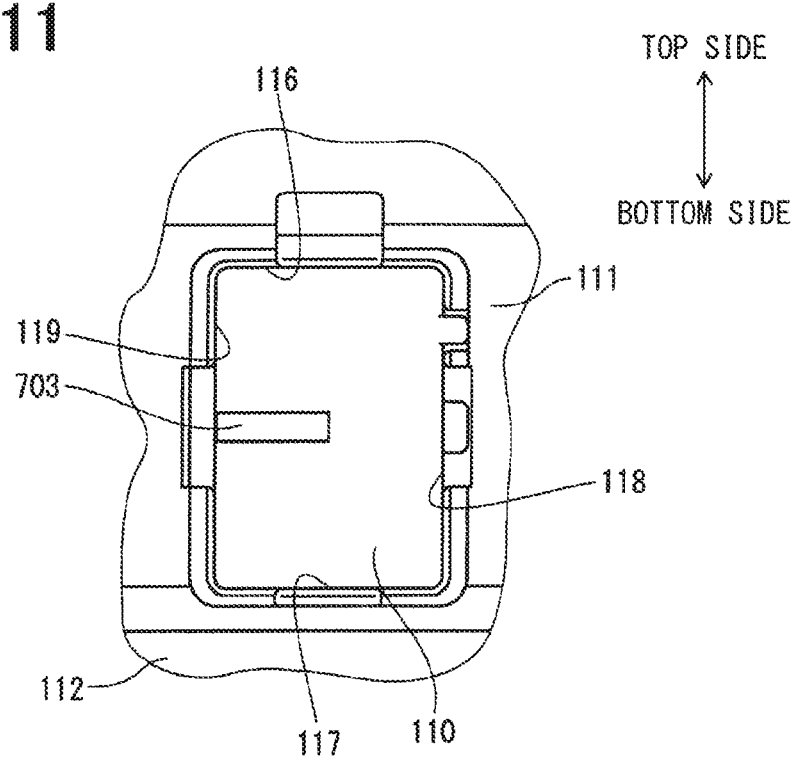
FIG. 11 is a partial enlarged view of an accelerator device according to a fourth embodiment of the present disclosure.

FIG. 11 indicates an enlarged view of the installation blocking portion 111 of the accelerator device according to the fourth embodiment.

A rib 703 is formed in the space 110 of the installation blocking portion 111. The rib 703 extends from the wall 119 to generally the center of the space 110. Thereby, the fourth embodiment can achieve the advantages (a), (b), (d) to (f) of the first embodiment and can reduce the amount of required resin that is required at the time of molding the rib in comparison to the third embodiment.

Fifth Embodiment

Next, an accelerator device according to a fifth embodiment of the present disclosure will be described with reference to FIG. 12. The fifth embodiment differs from the first embodiment with respect to the shape of the rib. In the following discussion, components, which are substantially the same as those of the first embodiment, are indicated by the same reference signs and will not be described redundantly for the sake of simplicity. An upper side of FIG. 12 will be described as a top side, and a lower side of FIG. 12 will be described as a bottom side.

Figure 12:
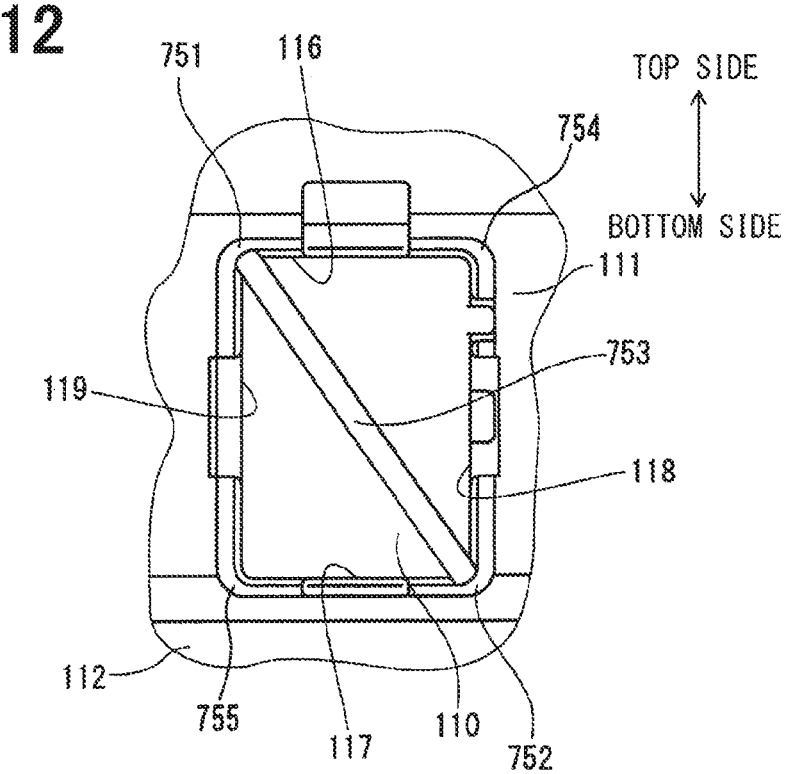
FIG. 12 is a partial enlarged view of an accelerator device according to a fifth embodiment of the present disclosure.

FIG. 12 indicates an enlarged view of the installation blocking portion 111 of the accelerator device according to the fifth embodiment.

A rib 753 is formed in the space 110 of the installation blocking portion 111. The rib 753 joins between a corner 751 which is formed between the top side inner wall 116 and the inner wall 119, and a corner 752, which is formed between the bottom side inner wall 117 and the inner wall 118. The fifth embodiment can achieve the advantages (a), (b), (d) to (f) of the first embodiment and can improve the strength of the installation blocking portion 111 in both of the top-to-bottom direction and the horizontal direction. In place of the above construction, the rib 753 may join between a corner 754, which is formed between the top side inner wall 116 and the inner wall 118, and a corner 755, which is formed between the bottom side inner wall 117 and the inner wall 119.

Sixth Embodiment

Next, an accelerator device according to a sixth embodiment of the present disclosure will be described with reference to FIG. 13. The sixth embodiment differs from the first embodiment with respect to the shape of the rib. In the following discussion, components, which are substantially the same as those of the first embodiment, are indicated by the same reference signs and will not be described redundantly for the sake of simplicity. An upper side of FIG. 13 will be described as a top side, and a lower side of FIG. 13 will be described as a bottom side.

Figure 13:
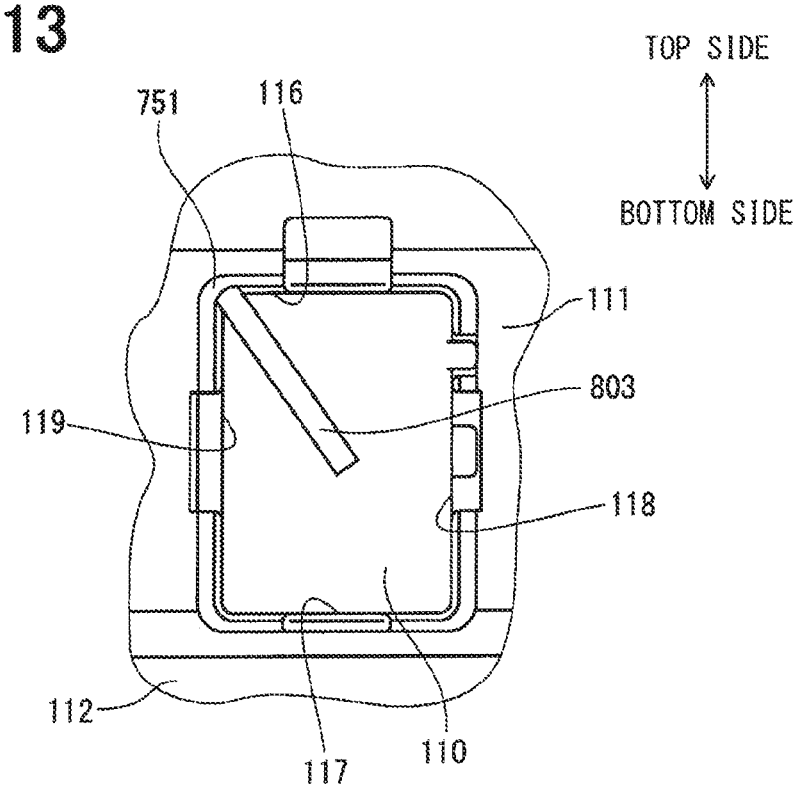
FIG. 13 is a partial enlarged view of an accelerator device according to a sixth embodiment of the present disclosure.

FIG. 13 indicates an enlarged view of the installation blocking portion 111 of the accelerator device according to the sixth embodiment.

A rib 803 is formed in the space 110 of the installation blocking portion 111. The rib 803 is formed to extend from the corner 751, which is formed between the top side inner wall 116 and the inner wall 119, to generally the center of the space 110. Thereby, the sixth embodiment can achieve the advantages (a), (b), (d) to (f) of the first embodiment and can reduce the amount of required resin that is required at the time of molding the rib in comparison to the fifth embodiment.

Other Embodiments (1) In the above embodiments, the installation blocking portion is formed in the support portion. Alternatively, the installation blocking portion may be formed at the operable portion. In such a case, the die device includes the die, which molds the operable portion, and the full opening stopper molding die, which molds the installation blocking portion. At this time, the die device may integrally mold the pedal boss, the arm connection, the pedal spring receiver, and the installation blocking portion.

Figure 14:
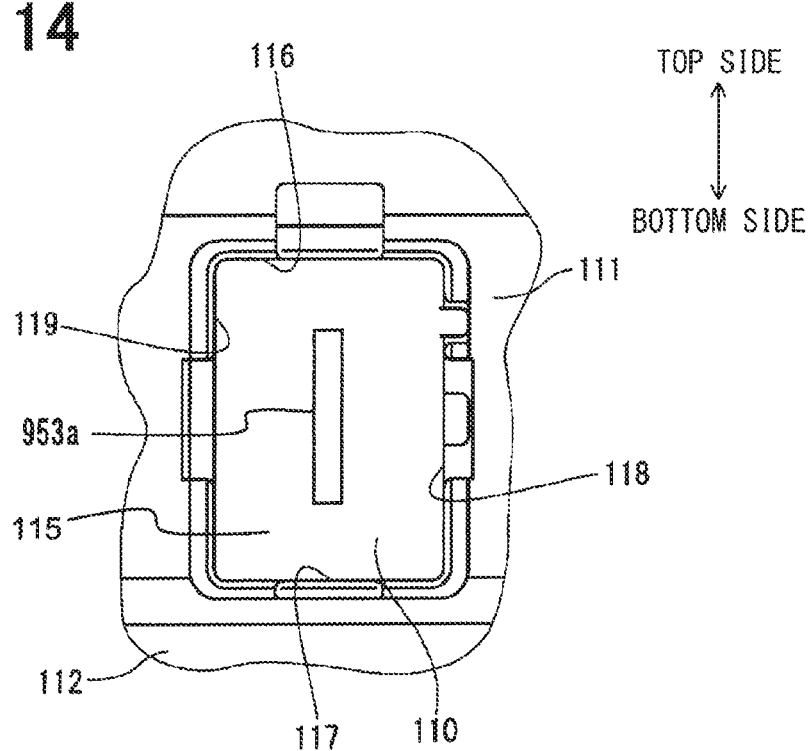
FIG. 14 is a partial enlarged view of an accelerator device according to another embodiment of the present disclosure.

(2) In the above embodiments, the rib, which serves as the projection, is joined to the inner wall(s) of the space. However, the rib may not be joined to the inner wall. Specifically, it is only required that the rib is formed to at least one of the base wall or the inner wall(s). For instance, as shown in FIG. 14, a rib 953*a*, which is elongated in the top-to-bottom direction, may be formed to extend from the base wall 115 toward the opening 110*a* of the space 110 without contacting the inner walls 116-119. Even with this construction, the rib 953*a* can reinforce the base wall 115 of the installation blocking portion 111 and limit deformation of the base wall 115.

Furthermore, the form of the projection of the present disclosure should not be limited to the rib. That is, any form of the projection may be used as long as the projection has the function of foolproof that prevents the installation of the unintended component (e.g., the kickdown switch 125 in the above embodiments) into the space 110 of the installation blocking portion 111. The unintended component discussed above should not be limited to the kickdown switch 125 and may include another type of component that has a shape, which is similar to the shape of the kickdown switch 125.

Figure 15:
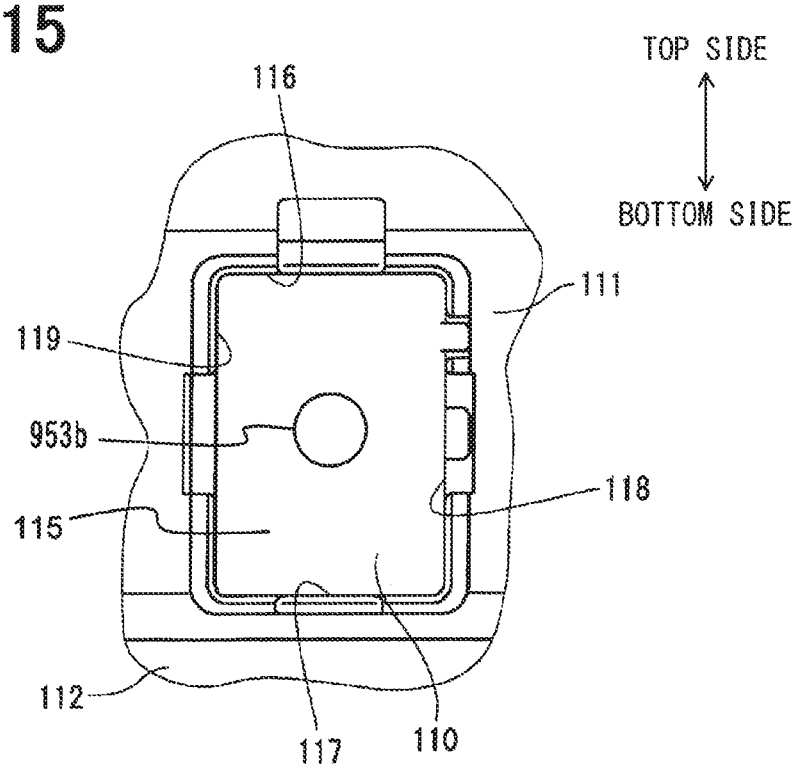
FIG. 15 is a partial enlarged view of an accelerator device according to another embodiment of the present disclosure.

For example, as shown in FIG. 15, the projection of the present disclosure may be a cylindrical projection 953*b*, which projects from the base wall 115 toward the opening 110*a* of the space 110 without contacting the inner walls 116-119. Here, it should be noted that a shape of a cross-section of the projection should not be limited to a circular shape. For instance, the shape of the cross-section of the projection may be, for example, an elliptic shape or a polygonal shape (e.g., a triangular shape, a rectangular shape). Furthermore, the number of projection(s) formed in the space 110 may be two or more. Similarly, the number of the rib(s) of the above embodiments formed in the space 110 may be two or more. Furthermore, at least two of the ribs of the above embodiments may be combined together.

Figure 16:
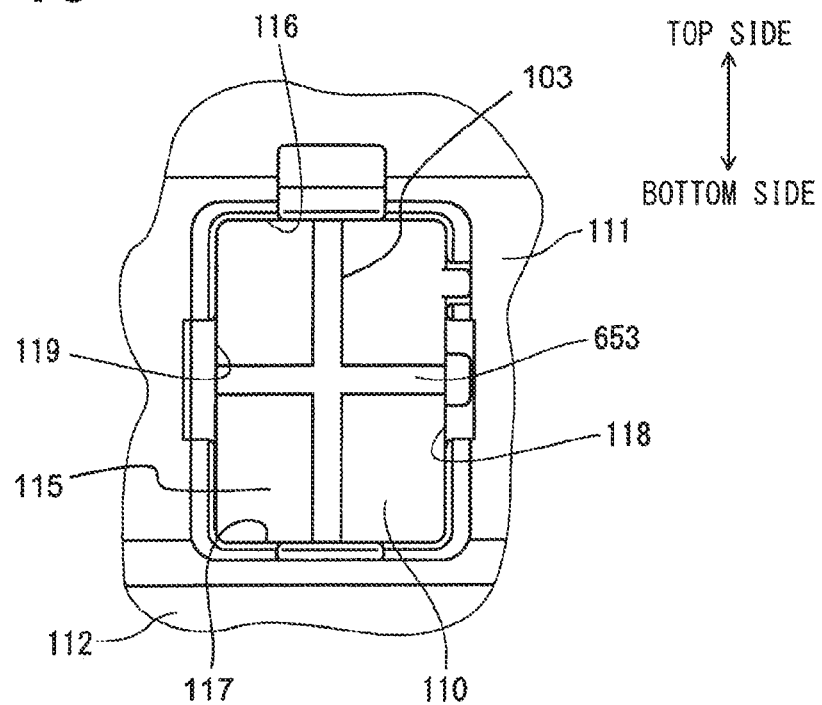
FIG. 16 is a partial enlarged view of an accelerator device according to another embodiment of the present disclosure.

For example, the rib 103, which joins between the inner wall 116 and the inner wall 117 of the first embodiment, may be crossed with the rib 653, which joins between the inner wall 118 and the inner wall 119 of the third embodiment, in a crisscross form shown in FIG. 16. When the ribs 103, 653 are crossed with each other in the crisscross form, the strength of the installation blocking portion 111 can be increased to further effectively limit the deformation of the installation blocking portion 111 in addition to preventing the erroneous installation of the kickdown switch 125 to the installation blocking portion 111.

Furthermore, in the above embodiments, the four inner walls (side walls) 116-119 are formed in the installation blocking portion 111, which serves as the recess. However, the number and the shape(s) of the inner walls (side walls) 116-119 may be appropriately modified according to the shape of the kickdown switch. For example, in a case of a kickdown switch, which is shaped into a cylindrical form, one cylindrical inner wall (side wall), which coincides with the cylindrical shape of the kickdown switch, may be formed in the installation blocking portion 111. Then, at least one rib may be extended from at least one of the cylindrical inner wall or the base wall.

(3) In the above embodiments, the kickdown switch has the function of notifying the driver that the rotational angle of the accelerator pedal relative to the support portion is the full opening position. However, the function of the kickdown switch should not be limited to this function. The kickdown switch may function as a full opening stopper of the accelerator device. Furthermore, the kickdown switch may have a function of outputting a signal for demanding a downshift control operation to the transmission of the vehicle, which is driven by the driver, when the support portion or the operable portion contacts the kickdown switch. Furthermore, the kickdown switch may have a function of outputting a signal for demanding release of an accelerator speed limiter that limits a traveling speed of the vehicle when the support portion or the operable portion contacts the kickdown switch. Furthermore, in a case where the accelerator device, which includes the support portion or the operable portion and the full opening limiting portion molded with the die device of the present disclosure, is installed on an electric vehicle, the kickdown switch may have a function of outputting a signal for demanding release of an EV mode when the operable portion or the support portion contacts the kickdown switch.

(4) In the above embodiments, the hysteresis mechanism is provided. However, the hysteresis mechanism may be eliminated.

The present disclosure should not be limited to the above embodiments and may be embodied in various forms without departing from the scope of the present disclosure.

The invention claimed is:

1. An accelerator device comprising:
    a support portion that is configured to be installed to a vehicle body;
    a shaft that is rotatably supported by the support portion;
    an operable portion that is configured to rotate integrally with the shaft and is depressible by a driver;
    a full opening limiting portion that is provided to one of the support portion and the operable portion, wherein the full opening limiting portion limits rotation of the operable portion in an accelerator opening direction when the full opening limiting portion contacts the other one of the support portion and the operable portion;
    a recess that is formed in the one of the support portion and the operable portion and has a space, which opens toward the other one of the support portion and the operable portion, wherein an opening of the space has a size that enables insertion of a base side of a kickdown switch into the space through the opening of the space;
    a rib that extends from a base wall of the recess toward the opening of the space and joins between two opposed inner walls of the recess, which are opposed to each other, to partition the space, wherein the rib limits erroneous insertion of the kickdown switch into the space of the recess through the opening of the space;
    a spring that urges the operable portion to rotate the operable portion in an accelerator closing direction; and
    a rotational angle sensing device that senses a rotational angle of the shaft relative to the support portion.

2. The accelerator device according to claim 1, wherein the projection connects between two of a plurality of corners of the recess, which are opposed to each other.

3. A die device comprising a die that is configured to mold the recess and the rib of the accelerator device of claim 1.

4. The die device according to claim 3, wherein:
    the die is a first die; and
    the die device further comprises a second die that is configured to mold an installation hole that is configured to receive the kickdown switch and is formed in place of the recess in the accelerator device, wherein the first die and the second die are configured to be replaced with one another depending on whether the accelerator device has the kickdown switch.

5. The die device according to claim 4, wherein:
    each of the first die and the second die is configured to mold the full opening limiting portion that has a contact surface that contacts the operable portion when the operable portion is rotated in the accelerator opening direction; and
    a length between an end surface of the first die, which molds an opposite surface of the full opening limiting portion that is opposite from the contact surface of the full opening limiting portion, and an end surface of the first die, which molds the contact surface of the full opening limiting portion, is larger than a length between an end surface of the second die, which molds an opposite surface of the full opening limiting portion that is opposite from the contact surface of the full opening limiting portion, and an end surface of the second die, which molds the contact surface of the full opening limiting portion.

* * * * *